United States Patent [19]

Soederhuyzen

[11] Patent Number: 4,513,767

[45] Date of Patent: Apr. 30, 1985

[54] FLUID DISTRIBUTION SYSTEM

[76] Inventor: Eduard Soederhuyzen, 330 Staalmeesterslaan, 1057 PC Amsterdam, Netherlands

[21] Appl. No.: 469,588

[22] Filed: Feb. 25, 1983

[30] Foreign Application Priority Data

Feb. 26, 1982 [NL] Netherlands ............. 8200796

[51] Int. Cl.³ ............................................ A01G 27/00
[52] U.S. Cl. ...................................... 137/119; 137/268
[58] Field of Search ............................ 137/119, 268

[56] References Cited

U.S. PATENT DOCUMENTS

| 3,408,674 | 11/1968 | Hogan | 137/268 X |
| 3,512,554 | 5/1970 | Childers | 137/119 X |
| 4,085,769 | 4/1978 | van Haaften | 137/119 |
| 4,267,857 | 5/1981 | van Haaften | 137/119 |

FOREIGN PATENT DOCUMENTS 2088763  1/1972  France ................. 137/119

Primary Examiner—Robert G. Nilson
Attorney, Agent, or Firm—Watson, Cole, Grindle & Watson

[57] ABSTRACT

A fluid distribution system comprises a fluid distribution conduit, a fluid inlet and a plurality of closeable fluid outlet branches. The distribution conduit further comprises a plug which can be propelled in response to the fluid pressure, whereas valves are provided with retaining means members for retaining the plug contrary to the fluid pressure for opening the valves. The retaining means become inoperative when the pressure of the fluid is being altered.

10 Claims, 6 Drawing Figures

FLUID DISTRIBUTION SYSTEM

BACKGROUND OF THE INVENTION

This invention relates to a system for distributing a fluid, comprising a fluid distribution conduit, a fluid inlet and a plurality of closeable fluid outlet branches, the distribution conduit being provided with a plug which can be propelled in response to the fluid pressure and is able to interact with a valve of an outlet branch, as disclosed in U.S. Pat. No. 4,085,769.

The known distribution system is used for distributing a gas or a liquid by means of valves arranged along the distribution conduit and which are connected with outlet branches adapted to irrigation purposes. For a relatively large area of soil, only a relatively small quantity of fluid is available per unit of time in this known system, as a simultaneous supply of fluid to all the outlet branches would cause each outlet branch to receive an insufficient quantity of fluid, the danger even existing of all the fluid flowing through the first outlet branches, so that the remaining outlet branches will be deprived of any fluid.

In the known system there is provided a plug having radially projectable parts which is propelled by the fluid until it engages a sleeve of a valve and subsequently opens the valve by a displacement of the sleeve, with the plug remaining therein in response to the fluid pressure, so that an outlet branch receives all the fluid supplied by the distribution conduit. The plug includes a built-in time relay causing radially projecting parts of the valve to be retracted after a given period of time, so that the plug can be removed from the sleeve of the valve in response to the fluid pressure in the distribution conduit and will then advance to the successive valve of a next outlet branch. A pressure drop occurring in the fluid at the plug at this moment, as the plug is being propelled ahead of the fluid, will stop the action of the time relay, so that the displaceable parts of the plug will be reset in a radially projecting direction outside the plug, causing the plug to engage in the sleeve of the next valve of an outlet branch and thus to open the valve. As soon as the plug has left the sleeve of a valve, the valve will be closed by the action of a spring-biased device.

It is a disadvantage of this known fluid distribution system that the plug having an enclosed time relay is rather vulnerable and will be subjected to interruptions, for instance as a result of deposits, so that it no longer operates satisfactorily. As a result, the entire fluid distribution system will become inoperable, whilst additionally the exact location of the plug in the distribution system cannot sufficiently be traced.

It is another shortcoming of the known fluid distribution system that the presence of the time relay enclosed in the plug requires the plug to have a given length with ample bends to prevent the plug from becoming jammed in a bend, whilst furthermore, all the outlet branches constantly receive an equal quantity of fluid due to the action of the plug, so the residence time of the plug in a sleeve of a valve, always remains the same.

It is an object of the present invention to improve on a fluid distribution system of this type, so that the above-described shortcomings are overcome.

SUMMARY OF THE INVENTION

This is achieved in accordance with the present invention with a fluid distribution system which is characterized in that the plug consists of a body displaceable through the distribution conduit and in that retaining means are locally provided in the distribution conduit for retaining the plug against to the fluid pressure and the retaining means are blocking members in the passage of the distribution system, which are switched on or disconnected in response to a pressure difference in the system, the retaining means additionally being disconnectable in response to a pressure in an outlet branch. Advantageously, the plug can hereby have the form of a ball.

According to this invention, the plug can easily be moved through the distribution conduit, even through very small bends, while the internal smoothness of couplings in the system can be decreased since the risk of a plain body such as a ball engaging behind an edge of, for example, a coupling or a pipe section, is smaller than the in case of the composite known body. It is an additional advantage of the present invention that it provides the possibility of providing with a fluid under pressure different outlet branches in a different manner during a shorter or longer period of time since the total quantity of fluid to be supplied to an outlet branch is no longer dependent upon the action of the plug.

The means for retaining the plug are preferably part of the valve of an outlet branch. A pressure difference for propelling the plug in the distribution system preferably being as large as possible in the fluid distribution system according to the invention; the supply of pressurized fluid preferably occurs via a jet nozzle of the injector type, the distribution system being a circuit on the one hand provided at the pressure side and on the other hand at the suction side of the jet nozzle and the jet nozzle being an annular slit around the passage of the plug.

At the location of the outlet branches of the distribution system there is provided a valve for each outlet branch, which comprises in response to the presence of the plug and the fluid pressure, a displaceable part for opening the passage to the outlet branch and is, according to the invention, so embodied that one or several locking members, in a closed position of the valve, project into the displaceable part in the passage for the plug, at least one of these locking members being deviable after the valve has been opened.

The present invention therefore also relates to a valve of an outlet branch for use in a fluid distribution system in accordance with the invention. The invention additionally relates to a device for the supply of a pressurized fluid for use in a fluid distribution system according to the invention.

DESCRIPTION OF THE DRAWINGS

The present invention is illustrated with the aid of an embodiment in the accompanying drawings, wherein.

DETAILED DESCRIPTION OF THE PREFERRED EMBODIMENTS

Figure 1:
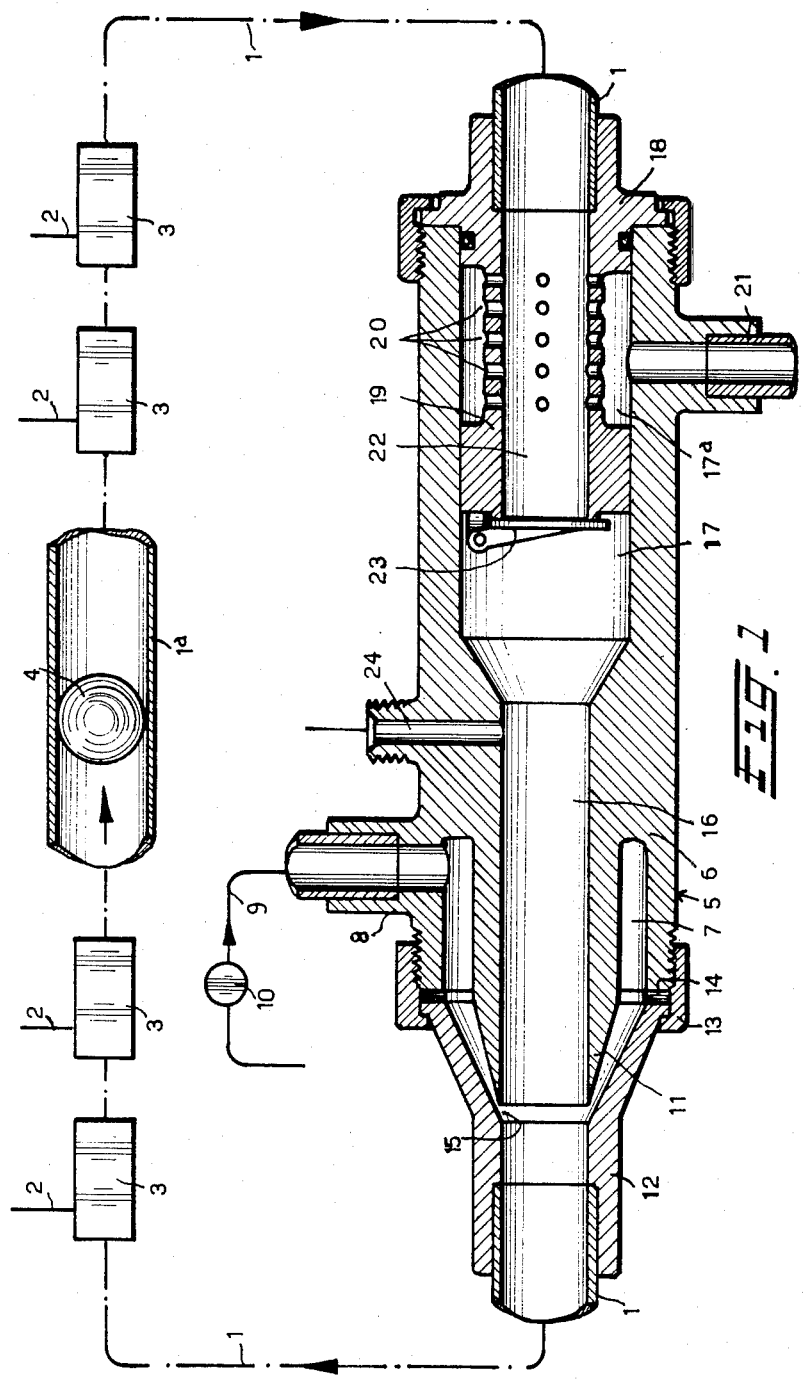
FIG. 1 is a diagrammatic view of a fluid distribution system including outlet branches, part of the system being depicted in section, and a device for the supply of pressurized fluid also depicted in an axial section.

FIG. 1 is a general view of the fluid distribution system with a distribution conduit 1 depicted by a dash-dot line 1, outlet branches 2 being connected to the conduit via diagrammatically illustrated valves 3. Although the action of the valves 3 will be described in more detail hereinafter, it is already stated that generally the valves are adapted to the passage and retaining, respectively, of a plug moving through the conduit 1. The plug, which is identified as numeral 4 in section 1a of the conduit 1, preferably is in the form of a ball and can be propelled through the system by supplied fluid, which in the case of an irrigation apparatus, may be water. The plug or ball 4 therefore consists of a plain body displaceable through the conduit 1, the conduit locally being provided with retaining means for retaining the plug against the action of the fluid pressure. More particularly, the retaining means consist of valves 3 in which the plug or ball is engaged, and through which fluid is supplied to outlet branches 2. The fluid is supplied to the fluid distribution system by a supply device 5, shown in section in FIG. 1, which consists in the depicted embodiment of a housing 1 comprising an annular chamber 7 which is connected with an inlet 8 of a conduit 9, the conduit 9 being connected to a source of pressurized fluid, which may consist of the conduit pipe of a basin or container from which fluid is supplied to inlet 8 and annular chamber 7, by means of a pump 10, as illustrated diagrammatically.

The annular chamber 7 comprises a tapering core 11, opening just ahead, considering the direction of fluid flow of the narrowest portion of a hopper-shaped cap 12 comprising a connection to the conduit 1 and which cap can be fixed upon a housing 6 by means of a nut 13 with a sealing ring or spacing ring 14 located therebetween. Changing the thickness of the ring 14 will enable an adjustment in the width of the annular slit 15. The housing 6 further comprises a passage 16, the diameter of which corresponds to the internal diameter of the conduit so that the plug or ball 4 can also pass through this passage 16. At the other end of the housing 6 a chamber 17 is provided which contains an insert 18, which on the one hand forms a connection for the conduit 1 and, on the other a core 19 with passage channels 20, forming an annular chamber 17a. An outlet connection 21 opening into the annular chamber 17a provided in chamber 17, may extend into a well or a basin to which a conduit 9 may also be connected for a purpose to be described hereinafter. When pressurized fluid is supplied to the fluid distribution system via conduit 9, the annular chamber 17 and the annular slit 15 act as a jet, causing a pressure drop to occur in passage 16. Since the conduit 1 forms a circuit, connected to the pressure side 12 and to the suction side 18 of the annular slit via chamber 17 and passage 16, the supply of pressurized fluid to the fluid distribution system 1 causing a pressure difference for propelling the plug or ball 4. Thus the plug or ball 4 is more effectively moved than if no suction action in passage 16 were to occur. On the other hand, it is not desired that the liquid column in turn be propelled in turn by the plug moving in the distribution conduit; thus passages 20 are provided through which excess liquids may escape to the annular chamber 17a and the outlet 21. The liquid supply is arranged such that the plug or ball 4 can pass through passage 22 in core 19 and passage 16, to be repropelled by supplied liquid after having passed the annular slit 15.

At the event that plug 4 is engaged in a valve 3, the suction action in passage 16 terminates, and liquid might otherwise flow back into passage 16, chamber 17 and passage 22 throught the annular slit 15. As the latter is not desirable, passage 22 is closed off by a non-return valve 23, located in chamber 17. The non-return valve is of the so-called flap-type, which can easily be pushed open by an advancing plug 4.

The passage 16 is further provided with an inlet 24 through which auxiliary fluid can be supplied, for instance consisting of certain feeding agents to be mixed with the irrigation fluid. The inlet can also be provided with a detector, e.g., a meter, for controlling the fluid flow through the passage 16.

A plug or ball 4 having advanced into a valve 3 of an outlet branch is retained at that location, so opening the valve to outlet branch 2 and allowing supplied fluid to flow through the associated outlet branch 2. This operation is described with reference to FIG. 2. The valve 3 consists of a housing 25 with a connection 26 for the fluid distribution conduit 1. The propelling action of liquid flowing through the distribution conduit, causes plug 4 to arrive in a central passage 27 of a valve body 28. The valve body includes means, in the form of locking means 39, for retaining the plug, which means, in the form of pins, are guided through radial openings in the wall of the valve body 28. Valve body 28 is influenced by the action of a spring 29, so that a conical circumferential mantle of valve body 28 closes off an annular chamber 30. The annular chamber 30 includes a connection 31 for an outlet branch 2. The fluid pressure exerted upon plug 4 will cause valve body 28 to be slightly displaced until the power of spring 29 becomes so great that a further opening of valve body 28 is no longer possible. Pressurized fluid may, however, also enter into the annular chamber 30 and outlet branch 2. Valve body 28 includes a circumferential flange 32 which functions as a piston in a chamber 33 of housing 25. Housing 25 and the annular chamber 30 are interconnected by a channel 34. The passage of this channel is adjustable by the aid of a pointed bolt 35, enabling only a very small amount of pressurized fluid to flow through the channel; the quantity of fluid is, however, sufficient to slowly displace the circumferential flange 32 and thus the valve body 28 against the action of spring 29.

Figure 2:
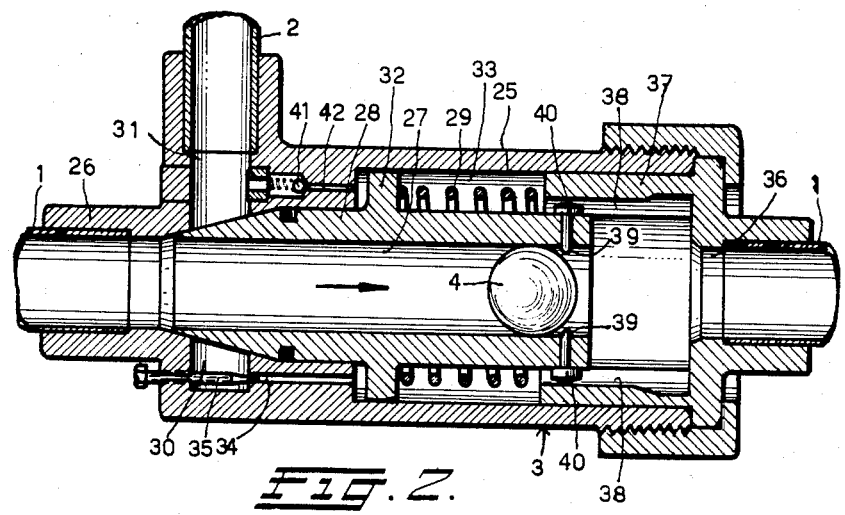
FIG. 2 is an axial section of a valve of an outlet branch in a first embodiment.
Figure 3:
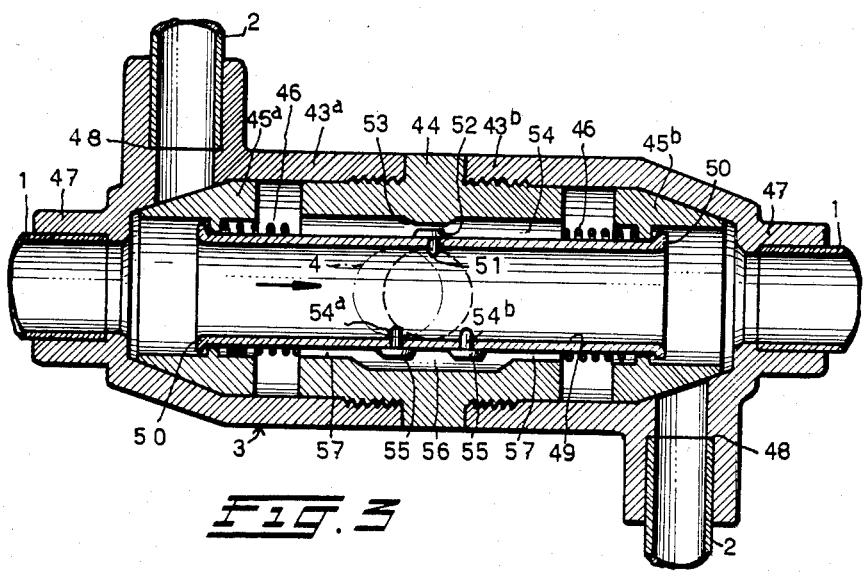
FIG. 3 is an axial section of a valve of an outlet branch in a second embodiment.

An insert 37 comprising a connection 36 for the fluid distribution conduit 1 is provided in the chamber 30; the insert also includes grooves 38 into which fits the heads 40 of pins 39. The heads 40 function as a blocking member as they press against the bottoms from the grooves 38 and prevent the pins 39 of deviating, thus retaining plug 4. In the vicinity of connection 36, however, the bottoms of grooves 38 slope radially outwardly, so that the pins 39 can deviate from the passage 27 in response to the pressure of plug 4, in this manner no longer retaining the plug, which thus may continue its movement through the distribution conduit via connection 36 and in response to the fluid pressure. The foregoing will therefore happen when fluid flowing through channel 34 has entirely brought valve body 28 into its final position. As soon as plug 4 is released by the blocking members or pins 39, hardly any fluid pressure will prevail to maintain the valve body in its open position against the action of spring 29, so that the spring will force the valve body into its closed position. The closing movement can be accelerated by the use of a non-return valve 41 in a channel 42. It will be evident that an adjustment of the pointed bolt 35 will result in an individual adjustment of the opening period of a valve 3, and that this action is no longer dependent on plug 4. In case certain outlet branches 2 have to be active for a longer period of time than others, the latter measure is particularly advantageous. FIG. 2 further shows that the retaining means in the form of blocking members 39 in the passage of the fluid distribution conduit are connectable or disconnectable in response to the pressure difference in the system; more particularly, they are disconnectable in response to a pressure prevailing in an outlet branch. It will also be obvious that the retaining means in the form of blocking members 39 form part of the valve 3 of the outlet branch 2. From this it follows that valve 3 of outlet branch 2 comprises a part in the form of valve body 28 which is displaceable in response to plug 4 together with the fluid pressure, one or more blocking means 39 within the displaceable part of valve body 28 in a closed position of valve 3, being able to deviate after having opened the valve. This is further elucidated with reference to FIG. 3, illustrating a valve 3, housing parts 43a, 43b which are provided upon a central portion 44. Each housing part 43a or 43b comprises a valve body 45a, 45b respectively, which are pressed in a closed position by means of a spring 46 bearing upon the central part 44, thus causing the passage of connection 47 of the fluid distribution system 1 towards connection 48 of the outlet branch 2 to be closed off. The valve bodies 45a and 45b are, by means of a collar, slideable around a sleeve 49, the end of which comprises outwardly bent edges 50 which prevent the sleeve from being drawn out of the valve bodies. The sleeve includes blocking members in the form of pins, the head 52 of one pin 51 of which, in a closed position of the two valve bodies 45a and 45b, abutting a cam 53 in a groove 54 in the central part 44. There are still provided two additional blocking members in the form of pins 54a and 54b, the heads 55 of which are located in a recessed part 56 of a groove 57 in central part 44. As soon as a plug 4 has been propelled by the fluid pressure in the fluid distribution system into the interior of the sleeve 49 of the valve 3, the plug will abut the blocking member in the form of pin 51. The blocking member in the form of a pin 54a can be passed as its head 55 is able to deviate into the recess 56 of the groove 57. Because of plug 4, abutting pin 51, sleeve 49 and valve body 45a are presently displaced in the direction of the arrow in response to the fluid pressure. Fluid from feed distribution conduit 1 can then flow towards outlet branch 2 because of valve body 45a having cleared the passage.

On further displacing sleeve 49, so further opening valve body 45a, head 52 of the pin 51 is cleared from cam 53 in groove 54, and is able to deviate. Plug 4 in the form of a ball is hereby displaced from the position illustrated with a dot-dash line, to the position illustrated by a dotted line (FIG. 3) as the plug 4 cannot be further displaced because the blocking member in the form of pin 54b with its head 54 is displaced from recess 56 of groove 57 to the unrecessed portion of the groove 57 so that valve body 45a remains open. As soon as the supply of fluid to the conduit 1 is interrupted for a short time, spring 46 of valve body 45a will move towards its closing position while retaining sleeve 49. Head 55 of pin 54b, subsequently arriving in the recess part 56, will be able to deviate so that plug 4, with a renewed fluid pressure in conduit 1, can be disengaged from sleeve 49 to continue its movement through conduit 1 to the next valve 3.

Valve 3 as shown in FIG. 3 is designed for moving a plug in an opposite direction. As soon as plug 4 has travelled its path through the distribution conduit, the fluid can be directed into the opposite direction, so subsequently opening valve bodies 45b.

Figure 4:
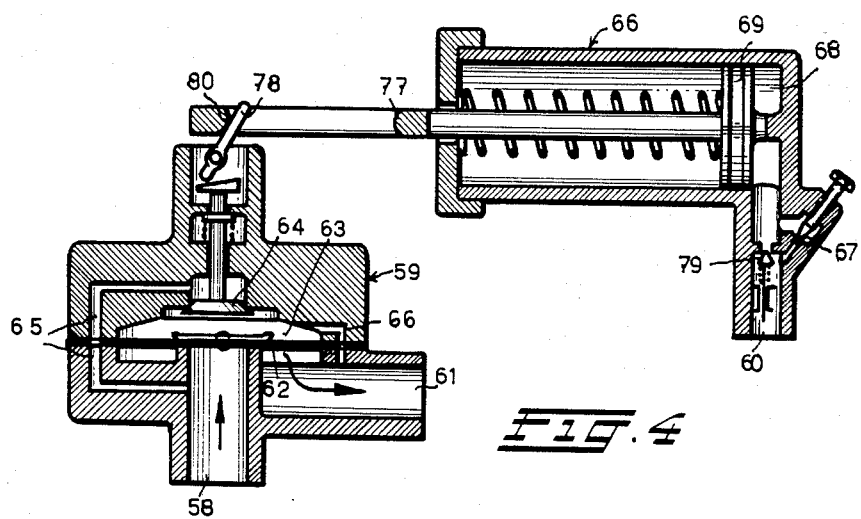
FIG. 4 is a diagrammatic section of a device for actuating pressure changes in the fluid distribution conduit.

It will be obvious that valve 3 can also be designed for a conveyance of fluid so that plug 4 can be adapted to be conveyed in one direction, whereby housing 43b is then replaced by a covering cap including a connection 47. In a closed position of valve 3 one or several blocking members 51, 54a and 54b, are provided in the passage for the plug within the displaceable parts, such as the sleeve 49 of the valve 3 of which at least one of the blocking members (51) is deviable after having opened the valve 3. Additionally at least one of the blocking members 54a, 54b in the passage of the plug is deviable at a closed position of the valve and blocks the passage of the open valve. As is clearly visible in FIG. 3, the blocking member 51 acting at a closed position of valve 3 and blocking member 54a or 54b active at an open position of valve 3, are positioned in a manner staggered with respect to each other, the blocking member 51 active in a closed position of valve 3 being positioned, in the axial direction of conduit 1, between two blocking members 54 and 54a located at distance from one the other, one of the latter two blocking members being active at an open position of valve 3. The valve is therefore suitable for conveying plug 4 in a reverse direction. Interrupting the fluid supply for the release of the valve can be effected by including a valve in the suction side of the jet nozzle which interacts with a delay relay, as shown in FIG. 4. Pressurized fluid is supplied in the direction of the arrow, to inlet 58 of the valve generally referenced 59. An auxiliary conduit supplies fluid to channel 60 of a relay.

Valve 59 is preferably accommodated in conduit 9 (FIG. 1), its channel 58 being directed to pump 10 and its channel 61 to inlet 5.

The valve comprises a membrane 62 which can close the mouth of channel 58 in case of a pressure prevailing in membrane chamber 63. Membrane chamber 63 further comprises a controllable valve 64, which can close off the connection of a channel 65 with membrane chamber 63. The membrane chamber 63 is further connected with channel 61 via a channel 66 comprising a narrowed passage.

In case of a closed valve 64, fluid supplied by pump 10 presses memebrane 62 from the mouth of channel 58 so that the fluid can flow via channel 61 to the inlet 5 and subsequently through the distribution system to the outlet branches 2. When plug 4 opens valve 3 as a result of fluid flowing through the distribution conduit, the circulation in the system will terminate and non-return valve 23 in the inlet will be closed so that pressure will prevail in passage channel 61.

In case channel 60 of the delay relay 66 is coupled to connection 24 by means of an auxiliary conduit, pressurized fluid flows into channel 60 and subsequently into cylinder space 68 via an adjustable throttle. Now a piston 69 is pressed in lateral direction contrary to the spring action, the time being required for the displacement of the piston along its entire stroke length being dependent upon the position of throttle 67. As soon as the piston is entirely displaced, an abutment 77 abuts a switch handle 78, so opening valve 64 so that pressurized fluid advances into membrane chamber 63 via channel 65, and membrane 62 closes the passage of channel 58 to channel 61.

By further emptying outlet branch 2, a pressure drop will occur in passage 16 and in the distribution conduit, so that the concerning valve 3 (FIG. 3) is released by plug 4 as well as piston 69, the spring of which will press away fluid in cylinder space 68 through non-return valve 79. An abutment 80 again presses switch handle 78 in a lateral direction, so releasing valve 64 via channel 66.

Figure 5:
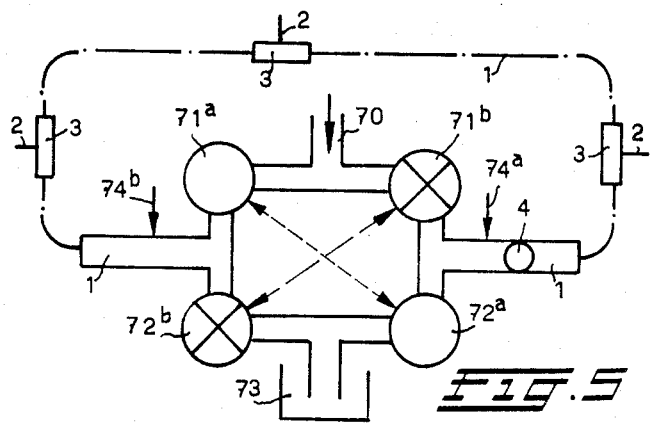
FIG. 5 is a diagram of a fluid distribution system of the invention comprising a control means for the supply of fluid, also diagrammatically depicted.
Figure 6:
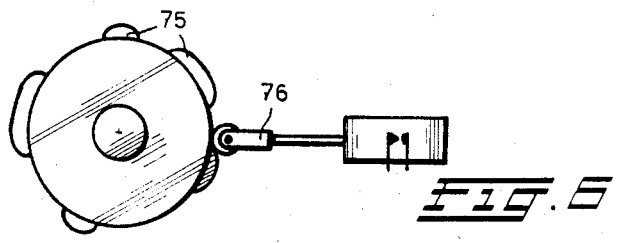
FIG. 6 is a diagrammatic view of a device for the control of the active period of time of separate fluid distribution conduits.

Subsequently, fluid is able to flow to inlet 5 and a next valve 3 can be controlled by plug 4. FIG. 5 schematically illustrates the reciprocating movement of plug 4 in the fluid distribution conduit 1, while using the valve 3 as shown in FIG. 3. A number of valves in a quadruplet arrangement is provided in the fluid distribution system and pressurized fluid is supplied through conduit 70, and advances to two valves 71a and 71b of which valve 71a is opened so that fluid flows to distribution conduit 1 along the valve in a direction corresponding to a rotational clockwise direction. A valve 72a is also opened for the purpose of a discharge via conduit 73, of superfluous fluid before plug 4. There is also provided a valve 72b, which as valve 71b, is closed. As soon as plug 4 advances to a detector depicted in the figure by arrow 74a, a signal switches over the system of the four valves 71a, 71b, 72a, 72b causing valves 71a and 72a to be closed and valves 71b and 72b to be opened. The supplied fluid now flows in counter flow through conduit 1 until plug 4 has arrived at a detector 74b, the signal of which causes the valve system to be reswitched into the position as shown. In the fluid distribution system according to the invention a constant reciprocating movement of the fluid can be obtained. As is customary in nurseries, according to the present invention, irrigation can also be realized by means of a switch device as illustrated in FIG. 6. This device then requires the use of cam discs or a cam roller, either the heights of the cams 75 or the recesses thereinbetween controlling a switching on, disconnection respectively of a certain outlet branch. The circumferentially extending length of the cam or the length of the recesses inbetween then determine the period of time of the irrigation. The use of a follower 76 known per se and interacting with the cams will provide the desired control signals for the supply and interruption, respectively, of the flow in the distribution system.

I claim:

1. In a fluid distribution system which comprises a conduit loop through which fluid can flow; means for supplying fluid to said conduit loop; a plurality of valve means located along said conduit loop, each valve means including a fluid outlet branch; and a plug positioned within said conduit loop and capable of passing therealong based on the flow of fluid therethrough, the sequential location of the plug in respective valve means causing fluid to flow through the associated fluid outlet branch, the improvement wherein said plug is in the form of a smooth-surfaced sphere, and wherein each said valve means includes a housing defining an axial passageway therethrough and through which fluid can pass, and a passage member which is axially movable along said axial passageway, said passage member defining an axial channel therein and mounting movable retaining means which project radially inwardly thereof into said axial channel, said movable retaining means being fully extended into said axial channel and preventing movement of said smooth-surfaced sphere through said axial channel at first predetermined axial positions of said passage member within said axial passageway and being repositioned radially outwardly with respect to said axial channel and allowing said smooth-surfaced sphere to move through said axial channel at second predetermined axial positions of said passage member within said axial passageway, the axial positioning of the passage member in said housing determining whether or not fluid will pass through the fluid outlet branch connected thereto.

2. The fluid distribution system as defined in claim 1 wherein said means for supplying fluid to said conduit loop includes a supply device connected in said conduit loop, said supply device including a housing defining a fluid passage therethrough, said housing having an upstream end an a downstream end, and a cap connected to the downstream end of said housing; said housing including an annular chamber radially outwardly of said passageway which, as it extends toward said cap, provides a jet nozzle therewith which communicates with said fluid passage, and wherein said housing includes means forming a fluid inlet for the supply of fluid to said annular chamber.

3. The fluid distribution system as defined in claim 2 wherein said housing includes an insert means at its upstream end, said insert means defining a flow channel therethrough and an upstream end, a middle portion and a downstream end, wherein said middle portion defines an annular space with said housing, said middle portion including radial channels providing fluid communication between the flow channel provided therein and said annular space; wherein a non-return valve is attached to the downstream end of said insert means to allow fluid flow therethrough in only one direction; and wherein said housing includes means forming a fluid outlet for the removal of fluid from said annular space.

4. The fluid distribution system as defined in claim 2 wherein means are included to provide a time-controlled pulsed fluid flow therein.

5. The fluid distribution system as defined in claim 4 wherein a fluid supply conduit is connected to the means forming the fluid inlet of the supply device housing, and wherein said means for providing a time-controlled pulsed fluid flow is connected in said fluid supply conduit.

6. The fluid distribution system as defined in claim 1 wherein each valve includes a spring means located between said housing and said passage member therein to bias said passage member towards its first said predetermined axial positions.

7. The fluid distribution system as defined in claim 6 wherein contact between said smooth-surfaced sphere and said retaining means will cause said passage member to move towards its second positions.

8. The fluid distribution system as defined in claim 6 wherein an annular groove is formed between the housing and the passage member; wherein each of said movable retaining means is in the form of a pin, the head of which is located in said annular groove; and wherein said annular groove is configured such that the heads of the pins are prevented from moving radially outwardly from said passage member when said passage member is in its first predetermined axial positions within said housing but are allowed to move radially outwardly from said passage member when said passage member is in its second predetermined axial positions.

9. The fluid distribution system as defined in claim 8 wherein said passage member includes two pins extending radially inwardly thereof from radially opposite points along its axial length.

10. The fluid distribution system as defined in claim 8 wherein said passage member includes three pins extending radially inwardly thereof, two of said three pins being aligned along the axial length of the passage member and the third of said three pins being located therebetween and at a radially opposite point.

* * * * *